J. P. TREADWELL.
HARROW.
APPLICATION FILED AUG. 9, 1916.
1,220,475.
Patented Mar. 27, 1917.
2 SHEETS—SHEET 1.
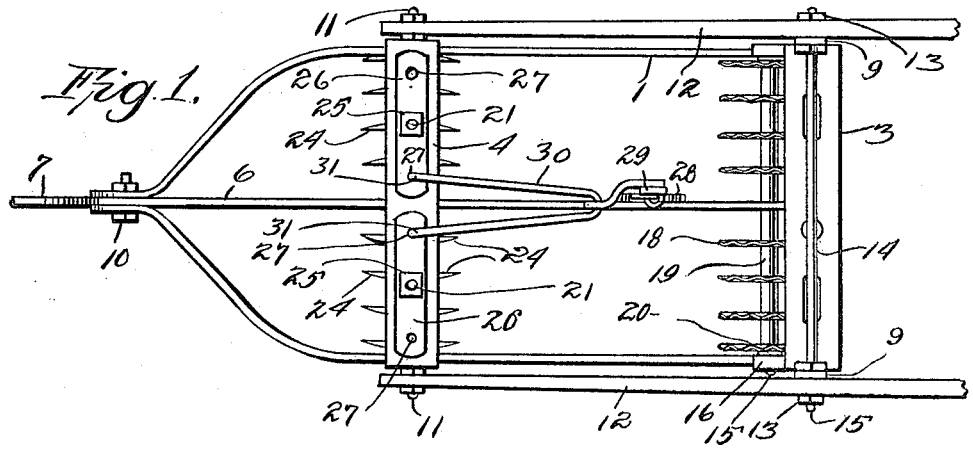
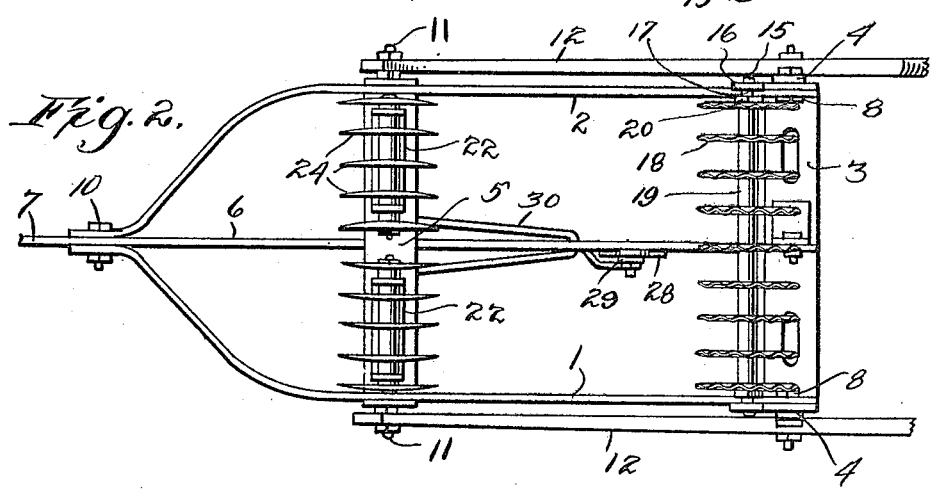
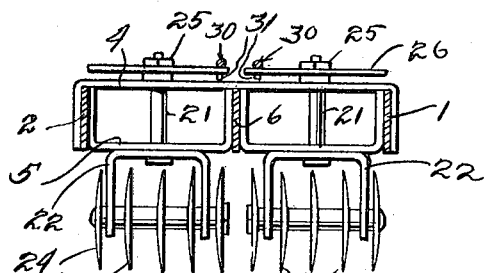
Inventor
J. P. Treadwell J. P. TREADWELL.
HARROW.
APPLICATION FILED AUG. 9, 1916.
1,220,475.  Patented Mar. 27, 1917.
2 SHEETS—SHEET 2.
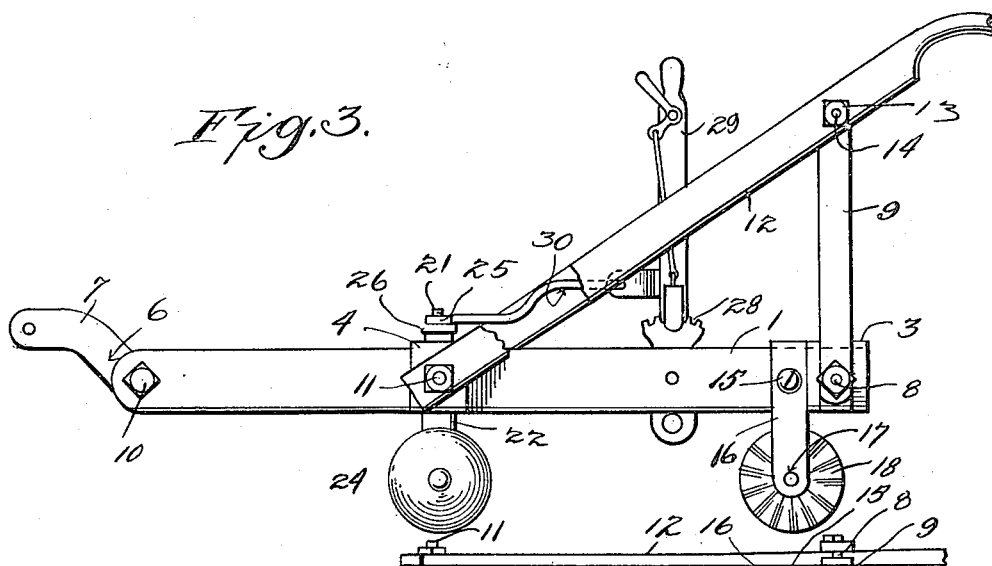
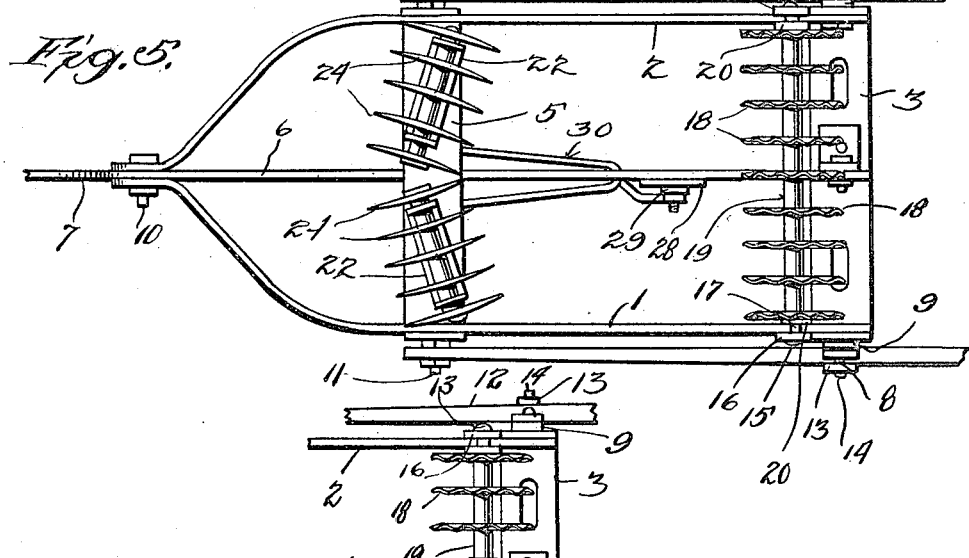
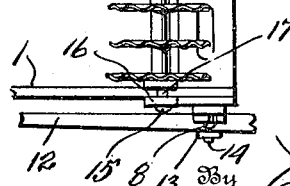
Inventor
J. P. Treadwell

UNITED STATES PATENT OFFICE.

JOHN P. TREADWELL, OF VAIDEN, MISSISSIPPI.

HARROW.

1,220,475.

Specification of Letters Patent.   Patented Mar. 27, 1917.

Application filed August 9, 1916.   Serial No. 114,007.

*To all whom it may concern:*

Be it known that I, JOHN P. TREADWELL, a citizen of the United States, residing at Vaiden, in the county of Carroll, State of Mississippi, have invented certain new and useful Improvements in Harrows; and I do hereby declare the following to be a full, clear, and exact description of the invention, such as will enable others skilled in the art to which it appertains to make and use the same.

This invention relates to a harrow.

An object of the invention resides in the provision of a device by means of which a growing crop may be cultivated and which can be adjusted to harrow a bed.

A further object of the invention resides in so constructing the device that it may be adjusted so that it will plow and harrow the ground at the same time.

With these and other objects in view such as will appear as my description progresses, my invention comprises the combination and arrangement of parts as set forth in and falling within the scope of the appended claims.

In the drawing:

Figure 1 is a top plan view of an implement constructed in accordance with my invention;

Fig. 2 is a bottom plan view thereof;

Fig. 3 is a side elevation;

Fig. 4 is a transverse sectional view showing the front disks in the positions they will occupy when coöperating with the rear disks as a harrow;

Fig. 5 is a bottom plan view showing the positions of the disks when the ground is being plowed and harrowed, simultaneously, and Fig. 6 is a similar view showing the arrangement of the rear disks when the device is used as a cultivator for a growing crop.

The embodiment of the invention illustrated in the drawing includes a frame which comprises side bars 1 and 2, a rear bar 3, a pair of spaced parallel front bars 4 and 5 and a central bar 6 which terminates in a draft member 7. The rear bar 3 is secured to the side bars 1 and 2 by bolts 8 which pass through the said side bars and bear bar and through upwardly extending braces 9. The central bar 6 and the side bars 1 and 2 are secured together by a bolt 10. The front bars 4 and 5 are secured to the side bars 1 and 2 by bolts 11, which bolts also pass through handle members 12 which extend upwardly on the outsides of the braces 9 and are secured to the latter by nuts 13 which are mounted on the transverse rod 14. Removably secured to the side bars 1 and 2 by screw 15 are depending bearing members 16 which terminate in spaced relation to the ground. Rotatably mounted in these bearing members 16 is a disk shaft 17 on which a plurality of corrugated disks 18 are mounted in spaced relation to each other. Disposed between these disks are sleeves 19 which encircle the shaft 17. In screw threaded engagement with the ends of the shaft 17 are nuts 20 which bear against the endmost disk forcing the sleeves 19 and the disks 18 tightly into contact with each other and securing the disks effectively to the shaft. By this arrangement the disks or any one of them may be removed from the shaft.

Rotatably mounted in and extending through the front bars 4 and 5 are standards 21 on the lower ends of which inverted U-shaped bearing members 22 are mounted, in which bearing members shafts 23 are supported. A plurality of concavo-convex cultivator disks 24 are mounted on these shafts 23 in a manner similar to that in which the disks 18 are mounted. The innermost disks 24 are, when the shafts 23 are in alinement, in spaced relation to each other. Secured to the upper ends of the standards 21 by nuts 25 are plates 26 in each end of each of which an aperture 27 is formed. The lengths of these plates and the lengths of the shafts 23 are such that the standards 21 may be completely rotated and the positions of the disks 24 reversed.

In order that the disks 24 may be maintained in any degree of angularity with relation to each other, I have secured a quadrant rack 28 to the central bar 6 and pivoted a controlling lever 29 on the rack which is provided with a spring pressed pawl coöperating with the teeth of the rack. A substantially U-shaped connecting link 30 is loosely and pivotally mounted on the lever 29 and is provided with a pair of bills 31 which extend into the adjacent apertures 27. The distance between the legs of this link 30 at the bills 31 is less than the distance between the adjacent apertures 27 when the shafts 23 are in alinement with each other so that when the bills 31 are engaged in the apertures 27 the legs of the link 30 will be under tension which will increase as the standards 21 are rotated. This insures the constant engagement of the link with the plates 26 but permits the link to be readily disengaged therefrom so that the positions of the disks 24 may be reversed.

Now in using this device the front disks 24 may be adjusted so that they will lie parallel to the rear disks 18 at which time the device may be successfully used as a bed harrow. When it is desired to use the device to cultivate growing crops the intermediate of the disks 18 may be removed which will permit the earth to each side of the row of plants to be harrowed and will permit the plants to pass through the space formed by the omission of the intermediate disks. The forward disks 24 may be adjusted to extend in angular relation to each other at which time they will, during the advance of the implement in one direction, plow the ground which will be harrowed simultaneously by the disks 18. These forward disks, when the implement is traveling in the opposite direction, may be reversed in position so that the turning of the earth will occur in the same direction. Furthermore the positions of the disks may be completely reversed by the rotation of the standards 21.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. In an implement of the class described, the combination with a frame, of standards rotatably mounted therein, harrow disks carried by the standards, plates secured to the upper ends of the standards and having apertures in the ends thereof, an adjusting lever and a U-shaped resilient link connected to the lever and having bills extending in to the adjacent apertures in said plates, the normal distance between the bills being less than the distance between the adjacent apertures when the plates are in alinement with each other.

2. In an implement of the class described the combination with a frame, of standards rotatably mounted therein, harrow disks carried by the standards, plates secured to the upper ends of the standards, an adjusting lever, and a resilient member having its ends connected to adjacent ends of said plates and its intermediate portion connected to said lever, the normal distance between the ends of said resilient member being less than the distance between the points of connection thereof with the plates when the latter are in alinement with each other.

In testimony whereof, I affix my signature, in the presence of two witnesses.

JOHN P. TREADWELL.

Witnesses:
H. A. LITTLE,
M. C. McCAIN.

Copies of this patent may be obtained for five cents each, by addressing the "Commissioner of Patents, Washington, D. C."